United States Patent
Ikeda

(10) Patent No.: US 10,673,369 B2
(45) Date of Patent: Jun. 2, 2020

(54) MOTOR CONTROL APPARATUS AND MOTOR CONTROL APPARATUS CONTROL METHOD

(71) Applicant: Mitsuba Corporation, Gunma (JP)

(72) Inventor: Takeshi Ikeda, Kiryu (JP)

(73) Assignee: Mitsuba Corporation, Gunma (JP)

( * ) Notice: Subject to any disclaimer, the term of this patent is extended or adjusted under 35 U.S.C. 154(b) by 0 days.

(21) Appl. No.: 16/330,177

(22) PCT Filed: Sep. 22, 2017

(86) PCT No.: PCT/JP2017/034292
§ 371 (c)(1),
(2) Date: Mar. 4, 2019

(87) PCT Pub. No.: WO2018/056397
PCT Pub. Date: Mar. 29, 2018

(65) Prior Publication Data
US 2019/0222161 A1 Jul. 18, 2019

(30) Foreign Application Priority Data

Sep. 23, 2016 (JP) .................................. 2016-185004

(51) Int. Cl.
*H02P 27/16* (2006.01)
*H02P 6/16* (2016.01)
(Continued)

(52) U.S. Cl.
CPC ............ *H02P 27/16* (2013.01); *H02K 11/215* (2016.01); *H02K 29/08* (2013.01); *H02M 7/48* (2013.01); *H02M 7/53871* (2013.01); *H02P 6/16* (2013.01)

(58) Field of Classification Search
CPC ... H02P 6/16; H02P 27/16; H02P 6/15; H02K 11/215; H02K 29/08; H02M 7/48; H02M 7/53871
See application file for complete search history.

(56) References Cited

U.S. PATENT DOCUMENTS 6,081,087 A * 6/2000 Iijima ....................... H02P 6/16
318/400.13
7,365,506 B2 * 4/2008 Yamamoto .......... H02P 23/0004
318/432
(Continued)

FOREIGN PATENT DOCUMENTS

| JP | 2000134979 A | 5/2000 |
|----|--------------|--------|
| JP | 2004254467 A | 9/2004 |

(Continued)

OTHER PUBLICATIONS

PCT Office, International Search Report issued in PCT/JP2017/034292 dated Dec. 26, 2017, 2 pages.
(Continued)

*Primary Examiner* — Thai T Dinh
(74) *Attorney, Agent, or Firm* — Wood Herron & Evans LLP

(57) ABSTRACT

A motor control apparatus includes: a gate control voltage output unit that outputs a drive signal based on a corrected Hall edge that constitutes each of six Hall stages; a counter value acquisition unit that acquires a counter value which is represented by a time period between two Hall edges from the position detection signal; and a switching control unit that allows a value obtained by multiplying a previous counter value of each of the Hall stages by a preset correction coefficient to be a first delay time of each of current Hall edges and allows the gate control voltage output unit to output the drive signal based on each of the Hall edges obtained by correcting each of the Hall edges corrected by (Continued)

the first delay time by a second delay time that advances a Hall edge corresponding to a predetermined sensor among the plurality of sensors.

9 Claims, 5 Drawing Sheets

(51) Int. Cl.
   *H02M 7/5387* (2007.01)
   *H02K 11/215* (2016.01)
   *H02K 29/08* (2006.01)
   *H02M 7/48* (2007.01)

(56) References Cited

U.S. PATENT DOCUMENTS

| | | | | |
|---|---|---|---|---|
| 8,692,491 | B2* | 4/2014 | Murai | H02P 6/14 |
| | | | | 318/400.01 |
| 9,455,656 | B2* | 9/2016 | Dixon | G01D 5/24476 |
| 10,291,173 | B2* | 5/2019 | Cox | H01M 2/204 |
| 10,439,525 | B2* | 10/2019 | Mizuo | H02P 6/16 |
| 2004/0104704 | A1* | 6/2004 | Hirono | H02P 6/00 |
| | | | | 318/722 |
| 2016/0254765 | A1* | 9/2016 | Nagano | H02P 6/16 |
| | | | | 318/400.06 |
| 2017/0110994 | A1* | 4/2017 | Tanaka | B62M 6/75 |

FOREIGN PATENT DOCUMENTS

| | | |
|---|---|---|
| JP | 2007259558 A | 10/2007 |
| JP | 2010119220 A | 5/2010 |
| JP | 4724024 B2 | 7/2011 |
| JP | 2015126548 A | 7/2015 |

OTHER PUBLICATIONS

European Patent Office, Search Report issued in EP 17853165.3 dated Mar. 26, 2020, 5 pages.

* cited by examiner

MOTOR CONTROL APPARATUS AND MOTOR CONTROL APPARATUS CONTROL METHOD

TECHNICAL FIELD

The present invention relates to a motor control apparatus and a motor control apparatus control method.

Priority is claimed on Japanese Patent Application No. 2016-185004 filed on Sep. 23, 2016, the contents of which are incorporated herein by reference.

BACKGROUND

A brushless motor includes a stator having three-phase coils U, V, W and a rotor having a field permanent magnet. A sensor magnet that is rotated together with the rotor is attached to a rotation shaft of the rotor. The sensor magnet is magnetized by S and N poles alternately in a rotation direction. Three Hall sensors that detect a rotation position are attached to the vicinity of the sensor magnet at an interval of 120° in the rotation direction such that it is possible to detect the switching of magnetic poles of the sensor magnet.

In a motor control apparatus that performs a drive control of the brushless motor, by outputting a power distribution pattern associated with Hall stages to an inverter circuit that drives the brushless motor on the basis of switching positions of three Hall sensors, the brushless motor is rotated.

FIGS. 4A, 4B are views showing a time chart of position detection signals Hu, Hv, Hw of the three Hall sensors when performing a drive control of the brushless motor. In FIGS. 4A, 4B, a horizontal axis represents an electric angle, and a vertical axis represents a voltage level of the position detection signal. As shown in FIG. 4A, the motor control apparatus has a configuration that outputs a drive signal for switching a switching element of the inverter circuit on the basis of a Hall edge that constitutes each of six Hall stages 1 to 6 which are represented by a combination of electric potentials of the position detection signals Hu, Hv, Hw that are outputs of the three sensors. A time period between two Hall edges that constitute each of the six Hall stages 1 to 6 corresponds to an electric angle 60° of a time period of a Hall stage.

That is, the time period of a Hall stage 1 corresponds to an electric angle 60° of a time period between a Hall edge which is a rising time point of the position detection signal Hu and a Hall edge which is a falling time point of the position detection signal Hw. The time period of a Hall stage 2 corresponds to an electric angle 60° of a time period between the Hall edge which is the falling time point of the position detection signal Hw and a Hall edge which is a rising time point of the position detection signal Hv. The time period of a Hall stage 3 corresponds to an electric angle 60° of a time period between the Hall edge which is the rising time point of the position detection signal Hv and a Hall edge which is a falling time point of the position detection signal Hu. The time period of a Hall stage 4 corresponds to an electric angle 60° of a time period between the Hall edge which is the falling time point of the position detection signal Hu and a Hall edge which is a rising time point of the position detection signal Hw. The time period of a Hall stage 5 corresponds to an electric angle 60° of a time period between the Hall edge which is the rising time point of the position detection signal Hw and a Hall edge which is a falling time point of the position detection signal Hv. The time period of a Hall stage 6 corresponds to an electric angle 60° of a time period between the Hall edge which is the falling time point of the position detection signal Hv and a Hall edge which is a rising time point of the position detection signal Hu.

In the time period of the Hall stage 1, a Hall pattern 5 that represents a combination of electric potentials of the position detection signals Hu, Hv, Hw is (H (high), L (Low), H). In the time period of the Hall stage 2, a Hall pattern 1 that represents a combination of electric potentials of the position detection signals Hu, Hv, Hw is (H, L, L). In the time period of the Hall stage 3, a Hall pattern 3 that represents a combination of electric potentials of the position detection signals Hu, Hv, Hw is (H, H, L). In the time period of the Hall stage 4, a Hall pattern 2 that represents a combination of electric potentials of the position detection signals Hu, Hv, Hw is (L, H, L). In the time period of the Hall stage 5, a Hall pattern 6 that represents a combination of electric potentials of the position detection signals Hu, Hv, Hw is (L, H, H). In the time period of the Hall stage 6, a Hall pattern 4 that represents a combination of electric potentials of the position detection signals Hu, Hv, Hw is (L, L, H). In this way, the motor control apparatus has a configuration that outputs a drive signal which switches the switching element of the inverter circuit on the basis of the Hall edge that constitutes each of the six Hall stages 1 to 6 which are represented by the combination of electric potentials of the position detection signals Hu, Hv, Hw that are outputs of the three sensors.

FIG. 4A described above shows a case of an ideal state in which the time period between two Hall edges that constitute each of the six Hall stages 1 to 6 is an electric angle 60° of the time period of the Hall stage. However, there may be cases in which, due to the dispersion of magnetization of the sensor magnet in the brushless motor, the dispersion of the attachment position of the Hall sensor, or the like, as shown in FIG. 4B, the time period between two Hall edges that constitute each of the six Hall stages 1 to 6 is not an electric angle 60° of the time period of the Hall stage.

FIG. 4B shows a case in which the time periods of the Hall stages 1, 4 are less than an electric angle 60°. That is, the time period of the Hall stage 1 between a Hall edge which is a rising time point of the position detection signal Hu and a Hall edge which is a falling time point of the position detection signal Hw is an electric angle t1r which is less than an electric angle 60°. The time period of the Hall stage 4 between a Hall edge which is a falling time point of the position detection signal Hu and a Hall edge which is a rising time point of the position detection signal Hw is an electric angle t4r which is less than an electric angle 60°.

In such a case, during the period of the electric angle t1r, the motor control apparatus outputs a PWM signal (drive signal), for example, that repeats H and L to the inverter circuit in accordance with a power distribution pattern that corresponds to the Hall pattern 5 which represents the combination of electric potentials of the position detection signals Hu, Hv, Hw. During the period of the electric angle t4r, the motor control apparatus outputs a PWM signal that repeats H and L to the inverter circuit in accordance with a power distribution pattern that corresponds to the Hall pattern 2 which represents the combination of electric potentials of the position detection signals Hu, Hv, Hw.

That is, the motor control apparatus outputs a drive signal to the inverter circuit that drives the brushless motor on the basis of switching positions of three Hall sensors and thereby rotates the brushless motor. However, actually, due to the dispersion of magnetization of the sensor magnet in the brushless motor, the dispersion of the attachment position of the Hall sensor, or the like, as shown in FIG. 4B, in the motor control apparatus, an actual rotor position and the Hall edge may be displaced from the electric angle 60°. In such a case, when switching the output of the drive signal for each Hall edge, there is a possibility that the switching may affect the motion of the brushless motor, and oscillation or an abnormal sound may occur.

Therefore, a motor drive apparatus is required having a configuration in which the position detection signal is corrected for each Hall edge that represents switching of a Hall stage and which switches a power distribution pattern on the basis of the corrected position detection signal.

Motor control apparatuses that prevent oscillation and an abnormal sound from occurring are described in Patent Documents 1, 2. However, the motor drive apparatuses described in Patent Documents 1, 2 do not have a configuration in which the position detection signal is corrected for each Hall edge that represents switching of a Hall stage and which switches a power distribution pattern on the basis of the corrected position detection signal, and therefore, it is impossible to prevent oscillation and an abnormal sound from occurring with good accuracy.

RELATED ART DOCUMENTS

Patent Documents

[Patent Document 1] Japanese Unexamined Patent Application, First Publication No. 2010-119220
[Patent Document 2] Japanese Patent No. 4724024

SUMMARY OF INVENTION

Problems to be Solved by the Invention

As described above, a motor drive apparatus is required having a configuration in which the position detection signal is corrected for each Hall edge that represents switching of a Hall stage and which switches a power distribution pattern on the basis of the corrected position detection signal.

Therefore, as shown in FIG. 5, a motor control apparatus is required including a function of allowing a time period of a Hall stage of which an interval (a time period of a Hall stage) between Hall edges is narrower than an electric angle 60° to be an electric angle 60°. FIG. 5 is a view showing an example of a time chart of position detection signals Hu, Hv, Hw of three Hall sensors when performing a drive control of a brushless motor.

As shown in FIG. 5, by correcting a time point of a Hall edge which is a falling time point of the position detection signal Hw to a position of an electric angle 60°, the time period of the Hall stage 1 is allowed to be an electric angle 60°. By correcting a time point of a Hall edge which is a rising time point of the position detection signal Hv to a position of an electric angle 120°, the time periods of the Hall stages 2, 3 are allowed to be an electric angle 60°. By correcting a time point of a Hall edge which is a rising time point of the position detection signal Hw to a position of an electric angle 240°, the time period of the Hall stage 4 is allowed to be an electric angle 60°. By correcting a time point of a Hall edge which is a falling time point of the position detection signal Hv to a position of an electric angle 300°, the time periods of the Hall stages 5, 6 are allowed to be an electric angle 60°.

However, since the sensor that outputs a position detection signal for each Hall edge which represents switching of a Hall stage is structurally designed on the basis of the V-phase, in a case where a correction is performed on the basis of the U-phase or the W-phase, when seen on the basis of the V-phase, an output timing of the position detection signal is displaced to a direction in which the output timing of the position detection signal is delayed compared to an originally designed output timing of the position detection signal. FIG. 6 is a view showing an example of a structure of three Hall sensors relative to a magnet.

As shown in FIG. 6, the three Hall sensors are constituted of a Hall sensor 3U that outputs the position detection signal Hu, a Hall sensor 3V that outputs the position detection signal Hv, and a Hall sensor 3W that outputs the position detection signal Hw. The three Hall sensors are attached to a planar substrate 3B that is separated from a sensor magnet 2. A distance from the Hall sensor 3V to the sensor magnet 2 is the shortest distance among distances of the three Hall sensors 3U, 3V, 3W to the sensor magnet 2. In this way, when the sensor is structurally designed on the basis of the V-phase, since the structure of the three Hall sensors with respect to the magnet is a structure that is attached to a planar substrate, there is a problem that the output timing of the position detection signal is displaced to a direction in which the output timing of the position detection signal is delayed relative to an originally designed output timing of the position detection signal compared to a structure of the related art in which three Hall sensors are arranged on a circumference with respect to a magnet. However, when the structure of the three Hall sensors with respect to the magnet is the structure that is attached to the planar substrate, there is also an advantage that it is possible to manufacture a low-cost motor control apparatus compared to the structure of the related art in which the three Hall sensors are arranged on the circumference with respect to the magnet.

An object of an aspect of the present invention is to provide: a low-cost motor control apparatus that has a configuration in which a position detection signal is corrected for each Hall edge that represents switching of a Hall stage and which switches a power distribution pattern at an electric angle 60° on the basis of the corrected position detection signal and that is capable of preventing oscillation and an abnormal sound from occurring with good accuracy by correcting the position detection signal to an originally designed output timing; and a control method of the motor control apparatus.

Means for Solving the Problem

An aspect of the present invention is a motor control apparatus that is configured to perform a power distribution control on three-phase coils of a brushless motor and that is configured to perform a rotation control of a rotor, the motor control apparatus including: a plurality of switching elements that are arranged to be capable of switching a current which is allowed to flow through the coils; a plurality of sensors each of which is provided so as to correspond to each of the coils and which are configured to detect a rotation position of the rotor; and a control part that is configured to output a drive signal which switches the switching element based on a position detection signal that is an output of the plurality of sensors, wherein the control part includes: a gate control voltage output unit that is configured to output a drive signal which switches the switching element based on a corrected Hall edge that constitutes each of six Hall stages which are represented by a combination of electric potentials of position detection signals that are outputs of the plurality of sensors; a counter value acquisition unit that is configured to acquire a counter value which is a time period of the Hall stage and which is represented by a time period between two Hall edges that constitute each of the Hall stages from the position detection signal; and a switching control unit that is configured to allow a value obtained by multiplying a previous counter value of each of the Hall stages by a preset correction coefficient to be a first delay time of each of current Hall edges and allow the gate control voltage output unit to output the drive signal based on each of the Hall edges obtained by correcting each of the Hall edges corrected by the first delay time by a second delay time that advances a Hall edge corresponding to a predetermined sensor among the plurality of sensors.

In the motor control apparatus described above, the control part may include: a reference position detection signal determination unit that is configured to allow, among two Hall edges that constitute a Hall stage of which a counter value acquired by the counter value acquisition unit is minimum, a Hall edge of which the counter value is decreased by enlarging the Hall edge in a rotation direction of the brushless motor to be a reference Hall edge and determine the position detection signal which corresponds to a phase at which the reference Hall edge is present as a reference position detection signal; an average value calculation unit that is configured to calculate an average value of counter values of three phases in the rotation direction of the brushless motor of the reference position detection signal; a detection error calculation unit that is configured to calculate a detection error which is a difference between the average value and the counter value of each of the Hall stages; and a correction coefficient calculation unit that is configured to calculate the correction coefficient of each of the Hall stages by dividing the detection error by the average value, wherein the switching control unit may: divide a first correction coefficient that is included in the correction coefficient and that is a detection error which is a difference between the average value and a counter value of a Hall stage corresponding to a predetermined sensor among the plurality of sensors by a second correction coefficient that is included in the correction coefficient and that is the average value; calculate the second delay time based on an angle obtained by multiplying a division result by 60°; and correct each of the Hall edges corrected by the first delay time by advancing an angle of each of the Hall edges by a time corresponding to the second delay time.

In the motor control apparatus described above, the control part may have a storage unit that is configured to store the correction coefficient by a calculation of the correction coefficient performed before shipping of the motor control apparatus.

In the motor control apparatus described above, the plurality of sensors may be attached to a planar substrate that is separated from a sensor magnet, and a distance from the predetermined sensor to the sensor magnet may be the shortest distance among distances of the plurality of sensors to the sensor magnet.

A motor control apparatus control method according to another aspect of the present invention is a control method of a motor control apparatus that is configured to perform a power distribution control on three-phase coils of a brushless motor and that is configured to perform a rotation control of a rotor, the motor control apparatus including: a plurality of switching elements that are arranged to be capable of switching a current which is allowed to flow through the coils; a plurality of sensors each of which is provided so as to correspond to each of the coils and which are configured to detect a rotation position of the rotor; and a control part that is configured to output a drive signal which switches the switching element based on a position detection signal that is an output of the plurality of sensors, the control part including a gate control voltage output unit, a counter value acquisition unit, and a switching control unit, the control method including: by way of the gate control voltage output unit, outputting a drive signal that switches the switching element based on a corrected Hall edge that constitutes each of six Hall stages which are represented by a combination of electric potentials of position detection signals that are outputs of the plurality of sensors; by way of the counter value acquisition unit, acquiring a counter value which is a time period of the Hall stage and which is represented by a time period between two Hall edges that constitute each of the Hall stages from the position detection signal; and by way of the switching control unit, allowing a value obtained by multiplying a previous counter value of each of the Hall stages by a preset correction coefficient to be a first delay time of each of current Hall edges and allowing the gate control voltage output unit to output the drive signal based on each of the Hall edges obtained by correcting each of the Hall edges corrected by the first delay time by a second delay time that advances a Hall edge corresponding to a predetermined sensor among the plurality of sensors.

Advantage of the Invention

As described above, according to an aspect of the present invention, it is possible to provide: a low-cost motor control apparatus that has a configuration in which a position detection signal is corrected for each Hall edge that represents switching of a Hall stage and which switches a power distribution pattern at an electric angle 60° on the basis of the corrected position detection signal and that is capable of preventing oscillation and an abnormal sound from occurring with good accuracy by correcting the position detection signal to an originally designed output timing; and a control method of the motor control apparatus.

DESCRIPTION OF THE EMBODIMENTS

Figure 1:
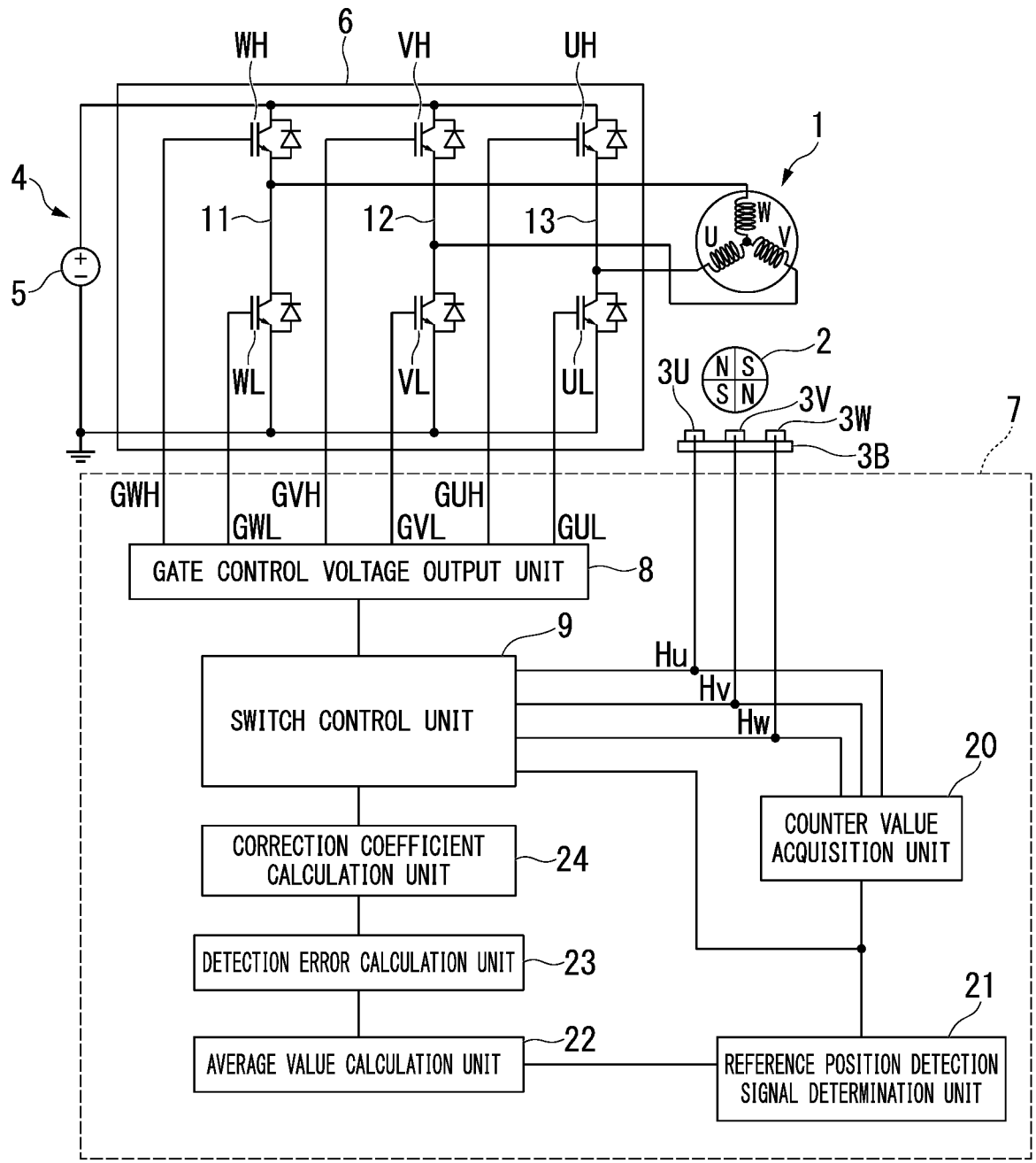
FIG. 1 is a block diagram showing a control system of a motor control apparatus according to an embodiment of the present invention.

Hereinafter, the present invention is described according to an embodiment, but the present invention is not limited to the following embodiment. Further, all of the combinations of features described in the embodiment are not necessarily indispensable for solving the problem addressed by the invention. In the drawings, the same reference numerals may be given to the same or similar parts, and redundant descriptions may be omitted. The shape, size, and the like of an element in the drawing may be exaggerated for clear description.

A motor control apparatus in an embodiment is a motor control apparatus that is configured to perform a power distribution control on three-phase coils of a brushless motor and that is configured to perform a rotation control of a rotor, the motor control apparatus including: a plurality of switching elements that are arranged to be capable of switching a current which is allowed to flow through the coils; a plurality of sensors each of which is provided so as to correspond to each of the coils and which are configured to detect a rotation position of the rotor; and a control part that is configured to output a drive signal which switches the switching element based on a position detection signal that is an output of the plurality of sensors, wherein the control part includes: a gate control voltage output unit that is configured to output a drive signal which switches the switching element based on a corrected Hall edge that constitutes each of six Hall stages which are represented by a combination of electric potentials of position detection signals that are outputs of the plurality of sensors; a counter value acquisition unit that is configured to acquire a counter value which is a time period of the Hall stage and which is represented by a time period between two Hall edges that constitute each of the Hall stages from the position detection signal; and a switching control unit that is configured to: allow a value obtained by multiplying a previous counter value of each of the Hall stages by a preset correction coefficient to be a first delay time of each of current Hall edges; and allow the gate control voltage output unit to output the drive signal based on each of the Hall edges obtained by correcting each of the Hall edges corrected by the first delay time by a second delay time that advances a Hall edge corresponding to a predetermined sensor among the plurality of sensors.

Hereinafter, the motor control apparatus in the embodiment is described with reference to the drawings.

FIG. 1 is a block diagram showing a control system of the motor control apparatus according to the embodiment of the present invention. FIG. 1 shows a configuration of a brushless motor 1 and a motor control apparatus 4.

A brushless motor 1 includes a stator having three-phase coils U, V, W and a rotor (not shown) having a field permanent magnet. A sensor magnet 2 that is rotated together with the rotor is attached to a rotation shaft of the rotor.

Figure 6:
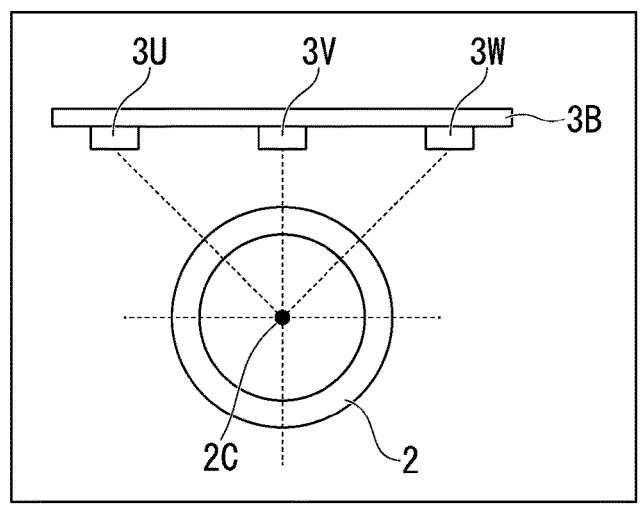
FIG. 6 is a view showing an example of a structure of the three Hall sensors relative to a magnet.

The sensor magnet 2 is magnetized by S and N poles alternately in a rotation direction. Three Hall sensors 3U, 3V, 3W that detect a rotation position are attached to the vicinity of the sensor magnet 2 at an interval of 120° in the rotation direction such that it is possible to detect the switching of magnetic poles of the sensor magnet 2. The three Hall sensors 3U, 3V, 3W are attached to a planar substrate 3B that is separated from the sensor magnet 2. A distance from the Hall sensor 3V (a predetermined sensor) to a center line 2C in the rotation of the sensor magnet 2 is the shortest distance among distances of the three Hall sensors 3U, 3V, 3W to the center line 2C (refer to FIG. 6). In the present embodiment, the Hall sensor 3V is the predetermined sensor; however, when another Hall sensor is attached to the planar substrate 3B at the shortest distance to the center line 2C, another Hall sensor having the shortest distance to the center line 2C may be the predetermined sensor.

A motor control apparatus 4 includes an inverter circuit 6 that switches a current which is allowed to flow from a DC electric power source 5 to the coils U, V, W, the three Hall sensors 3U, 3V, 3W, and a control part 7 to which an output of each of the Hall sensors 3U, 3V, 3W is input and which performs switching of the inverter circuit 6.

In the inverter circuit 6, three arms (a first arm 11, a second arm 12, and a third arm 13) are connected to the DC electric power source 5 in parallel. In the first arm 11, a connection point between two switching elements WH, WL is connected to the coil W. In the second arm 12, a connection point between two switching elements VH, VL is connected to the coil V. In the third arm 13, a connection point between two switching elements UH, UL is connected to the coil U.

The coils U, V, W are connected, for example, by a star connection. Each of end parts of the coils U, V, W on the opposite side of the connecting point is electrically connected to the inverter circuit 6.

The Hall sensors 3U, 3V, 3W included in the motor control apparatus 4 are formed of, for example, a Hall IC. When the rotation shaft of the rotor is rotated, the Hall sensors 3U, 3V, 3W detects the rotation position of the rotation shaft, the Hall sensor 3U outputs a position detection signal Hu as an output signal corresponding to the U-phase to the control part 7, the Hall sensor 3V outputs a position detection signal Hv as an output signal corresponding to the V-phase to the control part 7, and the Hall sensor 3W outputs a position detection signal Hw as an output signal corresponding to the W-phase to the control part 7.

The control part 7 is a microcomputer (processor, circuitry) that includes a CPU, a RAM, a ROM, and the like. The control part 7 includes a gate control voltage output unit 8, a switching control unit 9, a counter value acquisition unit 20, a reference position detection signal determination unit 21, an average value calculation unit 22, a detection error calculation unit 23, and a correction coefficient calculation unit 24.

The gate control voltage output unit 8 outputs PWM signals GWH, GWL, GVH, GVL, GUH, GUL (drive signal) which switch switching elements WH, WL, VH, VL, UH, UL on the basis of a corrected Hall edge that constitutes each of six Hall stages which are represented by the combination of electric potentials of the position detection signals Hu, Hv, Hw that are outputs of the Hall sensors 3U, 3V, 3W.

The counter value acquisition unit 20 acquires a counter value which is a time period of the Hall stage and which is represented by a time period between two Hall edges that constitute each of the Hall stages 1 to 6 from the position detection signals Hu, Hv, Hw that are input from the Hall sensors 3U, 3V, 3W.

The switching control unit 9 recognizes a Hall stage on the basis of the position detection signals Hu, Hv, Hw that are input from the Hall sensors 3U, 3V, 3W and reads out a power distribution pattern that corresponds to the Hall stage and that is stored in the ROM which is included in the control part 7.

The switching control unit 9 allows a value obtained by multiplying a previous (earlier by an electric angle 180°) counter value of each of the Hall stages by a preset correction coefficient to be a first delay time of each of current Hall edges, generates a PWM command signal having a time period of an electric angle 60° from the power distribution pattern on the basis of each of the Hall edges obtained by correcting each of the Hall edges corrected by the first delay time by a second delay time that advances a Hall edge corresponding to the Hall sensor 3V among the Hall sensors 3U, 3V, 3W, and allows the gate control voltage output unit 8 to output the PWM signal having a time period of an electric angle 60°.

In other words, the switching control unit 9 determines a value obtained by multiplying a previous counter value of each of the Hall stages by a preset correction coefficient as a first delay time of each of current Hall edges. The switching control unit 9 generates a PWM command signal (drive signal) having a time period of an electric angle 60° from the power distribution pattern on the basis of each of the Hall edges obtained by correcting each of the Hall edges corrected by the first delay time by a second delay time that advances a Hall edge corresponding to the Hall sensor 3V (a predetermined sensor) among the Hall sensors 3U, 3V, 3W (a plurality of sensors). The switching control unit 9 allows the gate control voltage output unit 8 to output the generated PWM signal having a time period of an electric angle 60°.

Thereby, each of the switching elements WH, WL, VH, VL, UH, UL is driven by a PWM control and is intermittently turned on and off in a time period that corresponds to each power distribution pattern.

The preset correction coefficient (correction coefficient 1, correction coefficient 2) is calculated by the reference position detection signal determination unit 21, the average value calculation unit 22, the detection error calculation unit 23, and the correction coefficient calculation unit 24 before shipping of the motor control apparatus 4 and is stored in the ROM (storage unit) that is included in the control part 7.

The reference position detection signal determination unit 21 allows, among two Hall edges that constitute a Hall stage of which a counter value that is acquired by the counter value acquisition unit 20 is minimum, a Hall edge of which the counter value is decreased by enlarging the Hall edge in a rotation direction of the brushless motor 1 to be a reference Hall edge and determines any one of the position detection signals Hu, Hv, Hw which corresponds to a phase at which the reference Hall edge is present as a reference position detection signal.

The average value calculation unit 22 calculates an average value (correction coefficient 2) of counter values of three phases in the rotation direction of the brushless motor 1 of the reference position detection signal that is determined by the reference position detection signal determination unit 21.

The detection error calculation unit 23 calculates a detection error (correction coefficient 1) which is a difference between the average value that is calculated by the average value calculation unit 22 and the counter value of each of the Hall stages.

The correction coefficient calculation unit 24 calculates a correction coefficient (correction coefficient 1/correction coefficient 2) of each of the Hall stages by dividing the detection error that is calculated by the detection error calculation unit 23 by the average value that is calculated by the average value calculation unit 22.

The switching control unit 9: divides a first correction coefficient that is included in the correction coefficient and that is a detection error which is a difference between the average value and a counter value of a Hall stage corresponding to the Hall sensor 3V among the Hall sensors 3U, 3V, 3W by a second correction coefficient that is included in the correction coefficient and that is the average value; calculates the second delay time based on an angle obtained by multiplying a division result by 60°; and corrects each of the Hall edges corrected by the first delay time by advancing an angle of each of the Hall edges by a time corresponding to the second delay time.

Thereby, it is possible for the switching control unit 9 to allow a value obtained by multiplying a previous counter value of each of the Hall stages by the preset correction coefficient (correction coefficient 1/correction coefficient 2) to be a first delay time of each of current Hall edges, generate a PWM command signal having a time period of an electric angle 60° from the power distribution pattern on the basis of each of the Hall edges obtained by correcting each of the Hall edges corrected by the first delay time by a second delay time that advances a Hall edge corresponding to the Hall sensor 3V among the Hall sensors 3U, 3V, 3W, and allow the gate control voltage output unit 8 to output the PWM signal having a time period of an electric angle 60°.

Hereinafter, a calculation method of the correction coefficient is described with reference to the drawings.

Figure 2:
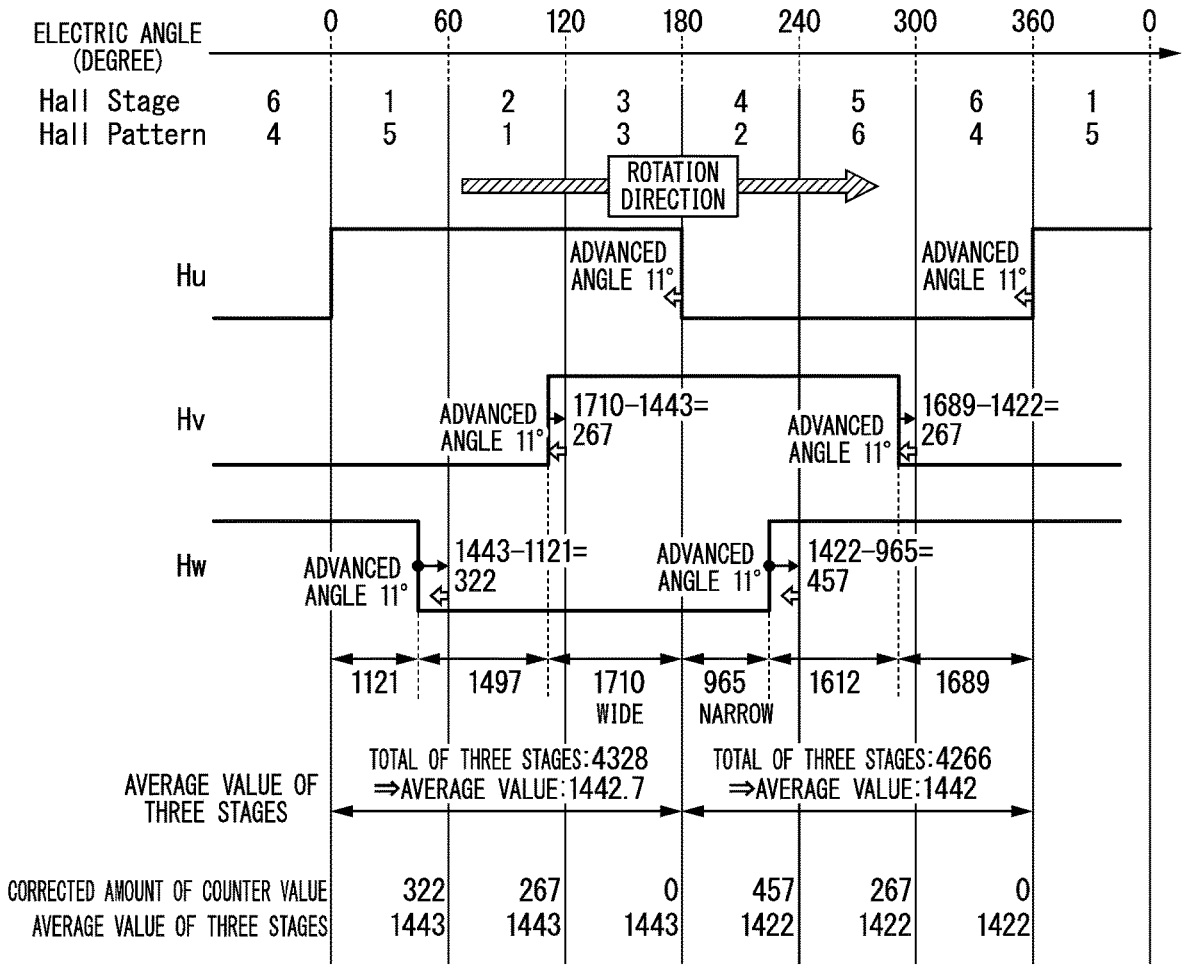
FIG. 2 is a view describing a calculation method of a correction coefficient when performing a normal rotation drive control of a brushless motor.

FIG. 2 is a view describing an example of a calculation of the correction coefficient when performing a normal rotation drive control of a brushless motor.

The rotation number of the motor when performing the calculation of the correction coefficient may be an arbitrary rotation number.

The counter value acquisition unit 20 acquires a counter value which is a time period of a Hall stage and which is represented by a time period between two Hall edges that constitute each of the Hall stages 1 to 6 from the position detection signals Hu, Hv, Hw that are input from the Hall sensors 3U, 3V, 3W.

In a case shown in FIG. 2, the counter value acquisition unit 20 acquires 1121 counts regarding the Hall stage 1, 1497 counts regarding the Hall stage 2, 1710 counts regarding the Hall stage 3, 965 counts regarding the Hall stage 4, 1612 counts regarding the Hall stage 5, and 1689 counts regarding the Hall stage 6.

Next, the reference position detection signal determination unit 21 allows, among two Hall edges that constitute a Hall stage of which the counter value that is acquired by the counter value acquisition unit 20 is minimum, a Hall edge of which the counter value is decreased by enlarging the Hall edge in the rotation direction of the brushless motor 1 to be a reference Hall edge and determines any one of the position detection signals Hu, Hv, Hw which corresponds to a phase at which the reference Hall edge is present as a reference position detection signal.

In the case shown in FIG. 2, since it is impossible for the reference position detection signal determination unit 21 to increase the count of the Hall stage 4 by enlarging the falling position of the position detection signal Hu that constitutes the Hall stage 4 of which the counter value is minimum among the six counter values with respect to the rotation direction, the reference position detection signal determination unit 21 allows the falling position of the position detection signal Hu as the reference Hall edge and determines the position detection signal Hu which corresponds to a phase at which the reference Hall edge is present as the reference position detection signal.

Next, the average value calculation unit 22 calculates an average value of counter values of three phases in the rotation direction of the brushless motor 1 of the reference position detection signal that is determined by the reference position detection signal determination unit 21.

In the case shown in FIG. 2, the average value calculation unit 22 calculates an average value 1442.7 from a total value 4328 of three stages (Hall stages 1 to 3) in which the position detection signal Hu is in a H level among the counter values of three phases in the rotation direction of the position detection signal Hu and calculates an average value 1422 from a total value 4266 of three stages (Hall stages 4 to 6) in which the position detection signal Hu is in a L level.

Next, the detection error calculation unit 23 calculates a detection error which is a difference between the average value that is calculated by the average value calculation unit 22 and the counter value of each of the Hall stages.

In the case shown in FIG. 2, the detection error calculation unit 23 calculates a detection error 322 of the Hall stage 1 by subtracting the counter value 1121 of the Hall stage 1 from the average value 1443 (a value obtained by rounding up the decimal part of 1442.7) that is calculated by the average value calculation unit 22.

The detection error calculation unit 23 calculates a detection error 267 of the Hall stage 2 by subtracting the average value 1443 that is calculated by the average value calculation unit 22 from the counter value 1710 of the Hall stage 3.

The detection error calculation unit 23 calculates a detection error 457 of the Hall stage 4 by subtracting the counter value 965 of the Hall stage 4 from the average value 1422 that is calculated by the average value calculation unit 22.

The detection error calculation unit 23 calculates a detection error 267 of the Hall stage 5 by subtracting the average value 1422 that is calculated by the average value calculation unit 22 from the counter value 1689 of the Hall stage 6.

In this way, the detection error calculation unit 23 calculates the detection error of each of the Hall stages such that the counter values of the Hall stages 1 to 6 become the same value.

Next, the correction coefficient calculation unit 24 calculates the correction coefficient of each of the Hall stages by dividing the detection error that is calculated by the detection error calculation unit 23 by the average value that is calculated by the average value calculation unit 22.

In the case shown in FIG. 2, the correction coefficient calculation unit 24 calculates the correction coefficient (in this case, correction coefficient 1/correction coefficient 2=322/1443) of the Hall stage 1 by dividing the detection error 322 that is calculated by the detection error calculation unit 23 by the average value 1443 that is calculated by the average value calculation unit 22.

The correction coefficient calculation unit 24 calculates the correction coefficient (in this case, correction coefficient 1/correction coefficient 2=267/1443) of the Hall stage 2 by dividing the detection error 267 that is calculated by the detection error calculation unit 23 by the average value 1443 that is calculated by the average value calculation unit 22.

The correction coefficient calculation unit 24 calculates the correction coefficient (in this case, correction coefficient 1/correction coefficient 2=0/1443) of the Hall stage 3 by dividing the detection error 0 that is calculated by the detection error calculation unit 23 by the average value 1443 that is calculated by the average value calculation unit 22.

The correction coefficient calculation unit 24 calculates the correction coefficient (in this case, correction coefficient 1/correction coefficient 2=457/1422) of the Hall stage 4 by dividing the detection error 457 that is calculated by the detection error calculation unit 23 by the average value 1422 that is calculated by the average value calculation unit 22.

The correction coefficient calculation unit 24 calculates the correction coefficient (in this case, correction coefficient 1/correction coefficient 2=267/1422) of the Hall stage 5 by dividing the detection error 267 that is calculated by the detection error calculation unit 23 by the average value 1422 that is calculated by the average value calculation unit 22.

The correction coefficient calculation unit 24 calculates the correction coefficient (in this case, correction coefficient 1/correction coefficient 2=0/1422) of the Hall stage 6 by dividing the detection error 0 that is calculated by the detection error calculation unit 23 by the average value 1422 that is calculated by the average value calculation unit 22.

In this way, the correction coefficient calculation unit 24 calculates the correction coefficient by which the counter values of the Hall stages 1 to 6 become the same value and allows the ROM included in the control part 7 to store the correction coefficient (correction coefficient 1, correction coefficient 2) when performing a normal rotation drive control of the brushless motor 1.

Thereby, the switching control unit 9 allows a value obtained by multiplying a previous counter value of each of the Hall stages by a preset correction coefficient (correction coefficient 1/correction coefficient 2) to be a first delay time of each of current Hall edges, generates a PWM command signal having a time period of an electric angle 60° from the power distribution pattern on the basis of each of the Hall edges obtained by correcting each of the Hall edges corrected by the first delay time by a second delay time that advances a Hall edge corresponding to the Hall sensor 3V among the Hall sensors 3U, 3V, 3W, and allows the gate control voltage output unit 8 to output the PWM signal having a time period of an electric angle 60°, and it is possible to perform a normal rotation drive control of the brushless motor 1.

For example, in the case of the example shown in FIG. 2, the switching control unit 9 allows a counter value of 223 obtained by multiplying a previous counter value (assumed as a counter value of 1000) of the Hall stage 1 by the preset correction coefficient (correction coefficient 1/correction coefficient 2=322/1443 described above) to be a first delay time of a falling time point (current Hall edge) of the position detection signal Hw that constitutes the Hall stage 1 and corrects the Hall edge corrected by the first delay time by advancing an angle of the Hall edge by a time corresponding to the second delay time. Here, the second delay time is a calculation result (shown by an advanced angle of 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6. Here, the switching control unit 9 calculates that 267/1443×60°≈11° (rounding down the decimal part), calculates that 267/1422×60°≈11° (rounding down the decimal part), performs a calculation of (11°+11°)/2=11° from these calculation results, and calculates an average value. The switching control unit 9 generates a PWM command signal on the basis of the Hall edge corrected by the second delay time that advances the Hall edge corresponding to the Hall sensor 3V.

Further, in the case of the example shown in FIG. 2, the switching control unit 9 allows a counter value obtained by multiplying the previous counter value of the Hall stage 2 by the correction coefficient 1/correction coefficient 2=267/

1443 described above to be a first delay time of a rising time point of the position detection signal Hv that constitutes the Hall stage 2 and corrects the Hall edge corrected by the first delay time by advancing an angle of the Hall edge by a time corresponding to the second delay time. Here, the second delay time is a calculation result (shown by an advanced angle of 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6. The switching control unit 9 generates a PWM command signal on the basis of the Hall edge corrected by the second delay time that advances the Hall edge corresponding to the Hall sensor 3V.

Further, in the case of the example shown in FIG. 2, the switching control unit 9 allows a counter value obtained by multiplying the previous counter value of the Hall stage 3 by the correction coefficient 1/correction coefficient 2=0/1443 described above to be a first delay time of 0 of a falling time point of the position detection signal Hu that constitutes the Hall stage 3 and corrects the Hall edge corrected by the first delay time of 0, that is, the Hall edge which is not corrected, by advancing an angle of the Hall edge by a time corresponding to the second delay time. Here, the second delay time is a calculation result (shown by an advanced angle of 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6. The switching control unit 9 generates a PWM command signal on the basis of the Hall edge corrected by the second delay time that advances the Hall edge corresponding to the Hall sensor 3V.

Further, in the case of the example shown in FIG. 2, the switching control unit 9 allows a counter value obtained by multiplying the previous counter value of the Hall stage 4 by the correction coefficient 1/correction coefficient 2=457/1422 described above to be a first delay time of a rising time point of the position detection signal Hw that constitutes the Hall stage 4 and corrects the Hall edge corrected by the first delay time by advancing an angle of the Hall edge by a time corresponding to the second delay time. Here, the second delay time is a calculation result (shown by an advanced angle of 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6. The switching control unit 9 generates a PWM command signal on the basis of the Hall edge corrected by the second delay time that advances the Hall edge corresponding to the Hall sensor 3V.

Further, in the case of the example shown in FIG. 2, the switching control unit 9 allows a counter value obtained by multiplying the previous counter value of the Hall stage 5 by the correction coefficient 1/correction coefficient 2=267/1422 described above to be a first delay time of a falling time point of the position detection signal Hv that constitutes the Hall stage 5 and corrects the Hall edge corrected by the first delay time by advancing an angle of the Hall edge by a time corresponding to the second delay time. Here, the second delay time is a calculation result (shown by an advanced angle of 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6. The switching control unit 9 generates a PWM command signal on the basis of the Hall edge corrected by the second delay time that advances the Hall edge corresponding to the Hall sensor 3V.

Further, in the case of the example shown in FIG. 2, the switching control unit 9 allows a counter value obtained by multiplying the previous counter value of the Hall stage 6 by the correction coefficient 1/correction coefficient 2=0/1422 described above to be a first delay time of 0 of a rising time point of the position detection signal Hu that constitutes the Hall stage 6 and corrects the Hall edge corrected by the first delay time of 0, that is, the Hall edge which is not corrected, by advancing an angle of the Hall edge by a time corresponding to the second delay time. Here, the second delay time is a calculation result (shown by 11° in FIG. 2) calculated by the switching control unit 9 based on an average value between an angle obtained by multiplying a division result by 60°, the division result being obtained by dividing a difference of 267 (first correction coefficient) between an average value of 1443 of the Hall stages 1 to 3 corresponding to the Hall sensor 3V and a counter value of 1710 of the Hall stage 3 by the average value of 1443 (second correction coefficient) of the Hall stages 1 to 3, and an angle obtained by multiplying a division result by 60°, the division result being obtained by dividing a difference of 267 (first correction coefficient) between an average value of 1422 of the Hall stages 4 to 6 corresponding to the Hall sensor 3V and a counter value of 1689 of the Hall stage 6 by the average value of 1422 (second correction coefficient) of the Hall stages 4 to 6.

The switching control unit 9 generates a PWM command signal on the basis of the Hall edge corrected by the second delay time that advances the Hall edge corresponding to the Hall sensor 3V.

In this way, on the basis of the V-phase that is structurally designed, the output timing of the position detection signal is corrected by advancing an angle of the Hall edge corrected by the first delay time by a time corresponding to the second delay time, and thereby, it is possible to correct the position detection signal to an originally designed output timing. Thereby, it is possible to generate a PWM command signal having a time period of an electric angle 60° from the power distribution pattern, allow the gate control voltage output unit 8 to output the PWM signal having a time period of an electric angle 60°, and perform a normal rotation drive control of the brushless motor 1. The advanced angle that becomes the V-phase basis is calculated from the correction coefficient that has been already set, and therefore, a new parameter is not required.

Figure 3:
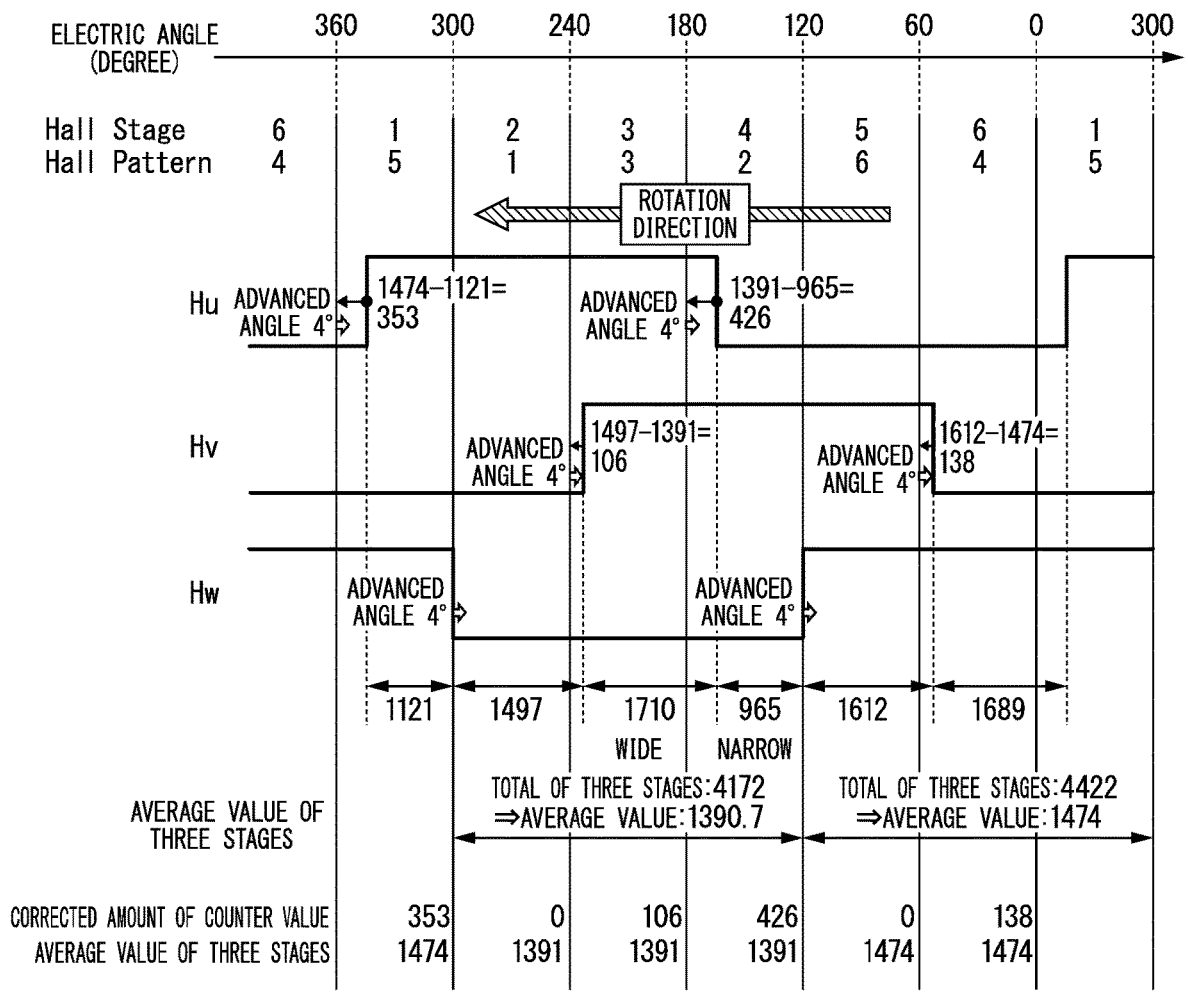
FIG. 3 is a view describing a calculation method of a correction coefficient when performing a reverse rotation drive control of the brushless motor.
Figure 4A:
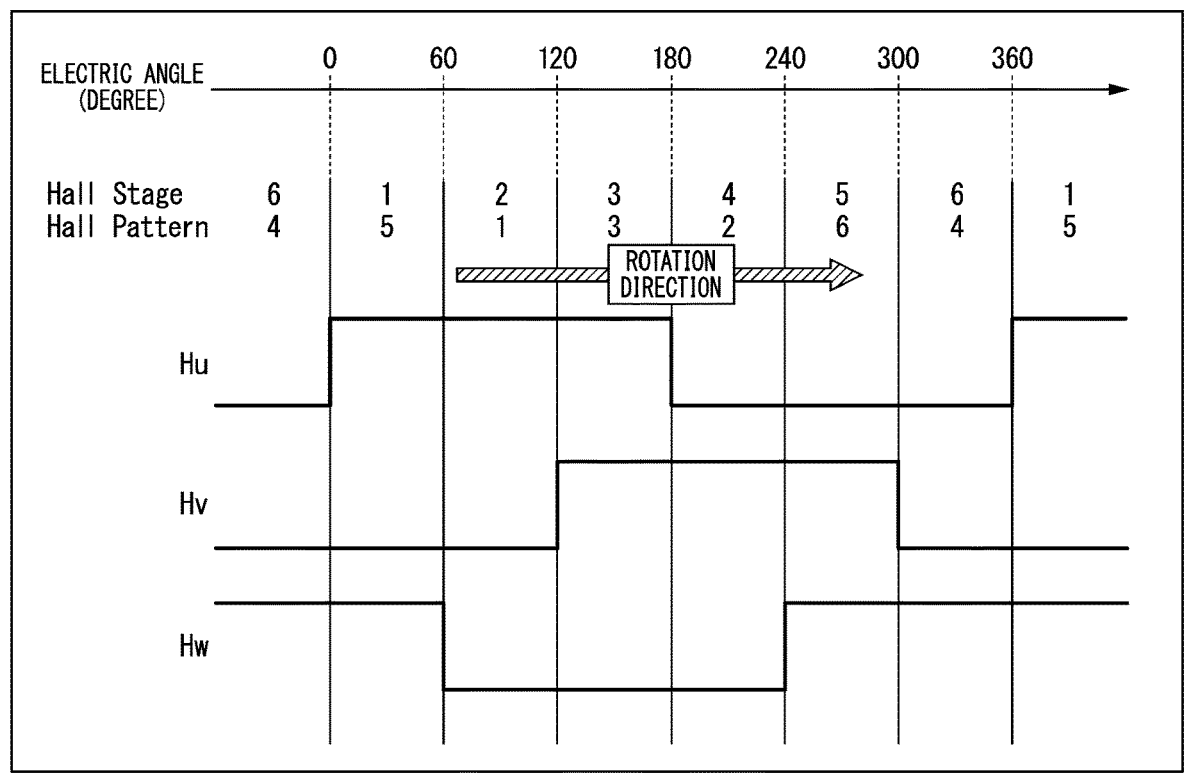
FIG. 4A is a view showing a time chart of position detection signals Hu, Hv, Hw of three Hall sensors when performing a drive control of the brushless motor.
Figure 4B:
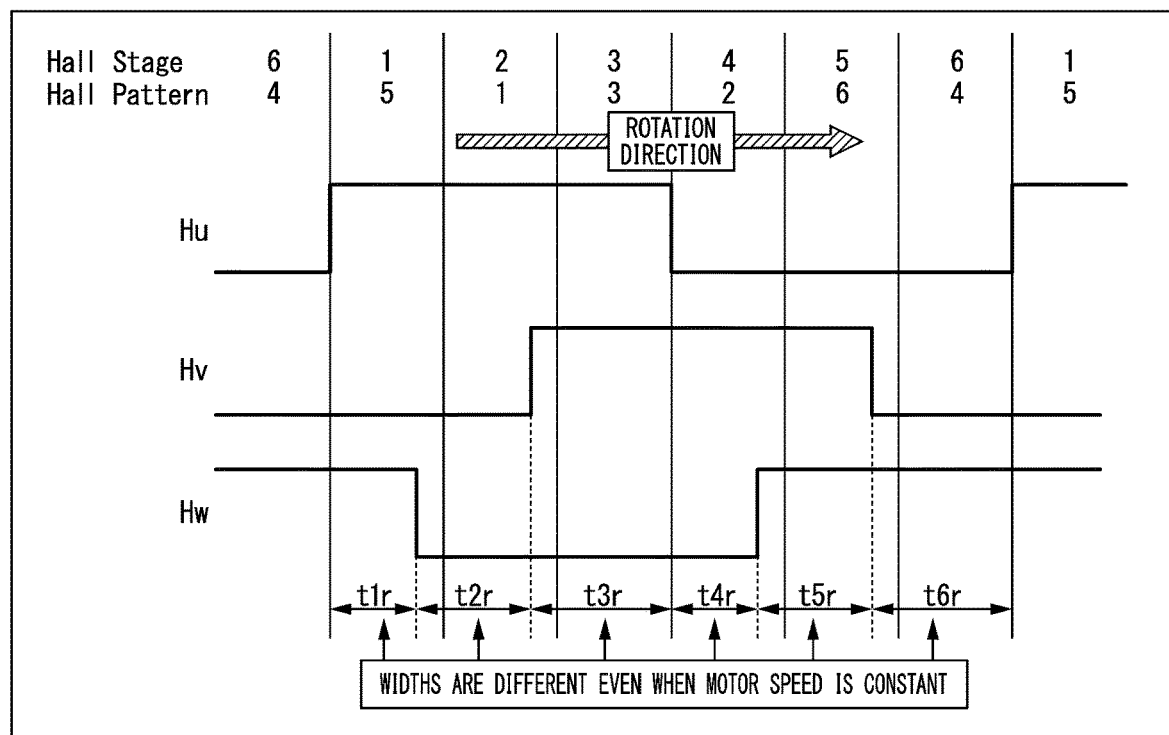
FIG. 4B is a view showing a time chart of the position detection signals Hu, Hv, Hw of the three Hall sensors when performing a drive control of the brushless motor.
Figure 5:
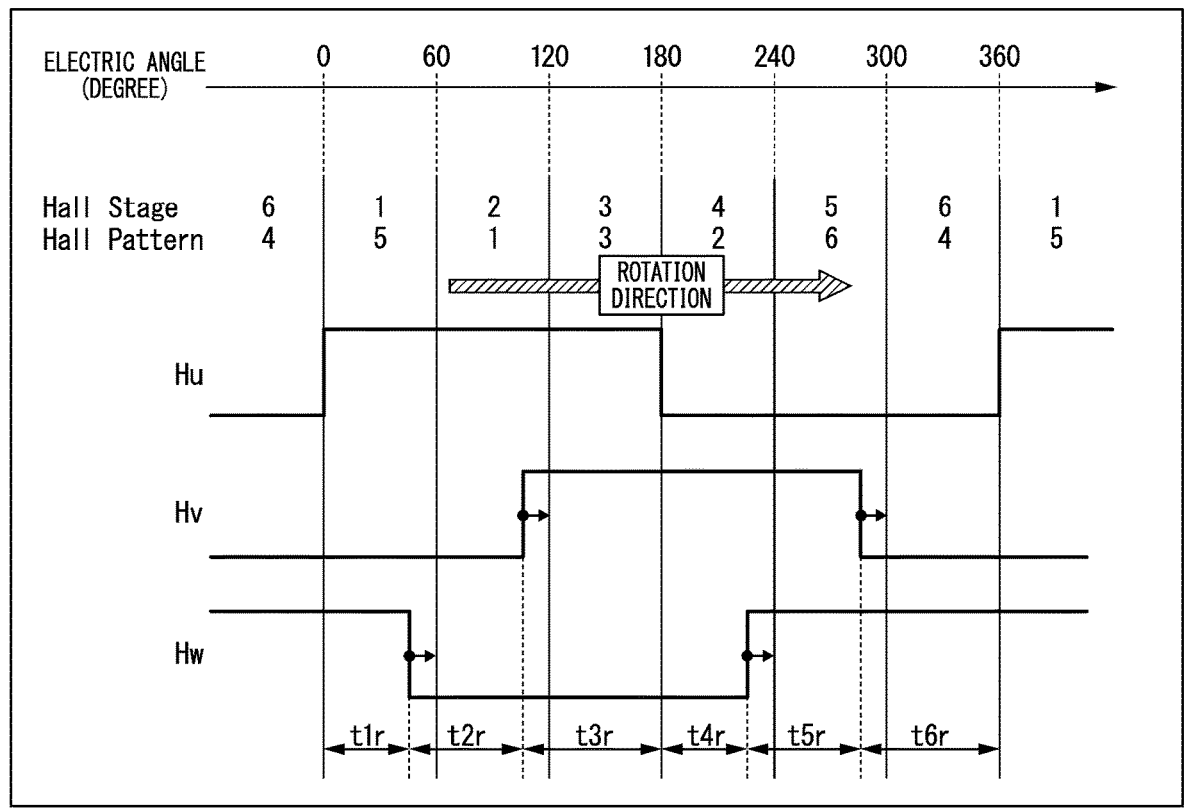
FIG. 5 is a view showing an example of a time chart of the position detection signals Hu, Hv, Hw of the three Hall sensors when performing a drive control of the brushless motor.

FIG. 3 is a view describing an example of a calculation of the correction coefficient when performing a reverse rotation drive control of the brushless motor.

The rotation number of the motor when performing the calculation of the correction coefficient may be an arbitrary rotation number.

The counter value acquisition unit 20 acquires a counter value which is a time period of a Hall stage and which is represented by a time period between two Hall edges that constitute each of the Hall stages 1 to 6 from the position detection signals Hu, Hv, Hw that are input from the Hall sensors 3U, 3V, 3W.

In a case shown in FIG. 3, the counter value acquisition unit 20 acquires 1689 counts regarding the Hall stage 6, 1612 counts regarding the Hall stage 5, 965 counts regarding the Hall stage 4, 1710 counts regarding the Hall stage 3, 1497 counts regarding the Hall stage 2, and 1121 counts regarding the Hall stage 1.

Next, the reference position detection signal determination unit 21 allows, among two Hall edges that constitute a Hall stage of which the counter value that is acquired by the counter value acquisition unit 20 is minimum, a Hall edge of which the counter value is decreased by enlarging the Hall edge in the rotation direction of the brushless motor 1 to be a reference Hall edge and determines any one of the position detection signals Hu, Hv, Hw which corresponds to a phase at which the reference Hall edge is present as a reference position detection signal.

In the case shown in FIG. 3, since it is impossible for the reference position detection signal determination unit 21 to increase the count of the Hall stage 4 by enlarging the falling position of the position detection signal Hw that constitutes the Hall stage 4 of which the counter value is minimum among the six counter values with respect to the rotation direction, the reference position detection signal determination unit 21 allows the falling position of the position detection signal Hw to be the reference Hall edge and determines the position detection signal Hw which corresponds to a phase at which the reference Hall edge is present as the reference position detection signal.

Next, the average value calculation unit 22 calculates an average value of counter values of three phases in the rotation direction of the brushless motor 1 of the reference position detection signal that is determined by the reference position detection signal determination unit 21.

In the case shown in FIG. 3, the average value calculation unit 22 calculates an average value 1474 from a total value 4422 of three stages (Hall stages 1, 6, 5) in which the position detection signal Hw is in a H level among the counter values of three phases in the rotation direction of the position detection signal Hw and calculates an average value 1390.7 from a total value 4172 of three stages (Hall stages 2 to 4) in which the position detection signal Hw is in a L level.

Next, the detection error calculation unit 23 calculates a detection error which is a difference between the average value that is calculated by the average value calculation unit 22 and the counter value of each of the Hall stages.

In the case shown in FIG. 3, the detection error calculation unit 23 calculates a detection error 353 of the Hall stage 1 by subtracting the counter value 1121 of the Hall stage 1 from the average value 1474 that is calculated by the average value calculation unit 22.

The detection error calculation unit 23 calculates a detection error 106 of the Hall stage 3 by subtracting the average value 1391 (a value obtained by rounding up the decimal part of 1390.7) that is calculated by the average value calculation unit 22 from the counter value 1497 of the Hall stage 2.

The detection error calculation unit 23 calculates a detection error 426 of the Hall stage 4 by subtracting the counter value 965 of the Hall stage 4 from the average value 1391 that is calculated by the average value calculation unit 22.

The detection error calculation unit 23 calculates a detection error 138 of the Hall stage 6 by subtracting the average value 1474 that is calculated by the average value calculation unit 22 from the counter value 1612 of the Hall stage 5.

In this way, the detection error calculation unit 23 calculates the detection error of each of the Hall stages such that the counter values of the Hall stages 1 to 6 become the same value.

Next, the correction coefficient calculation unit 24 calculates the correction coefficient of each of the Hall stages by dividing the detection error that is calculated by the detection error calculation unit 23 by the average value that is calculated by the average value calculation unit 22.

In the case shown in FIG. 3, the correction coefficient calculation unit 24 calculates the correction coefficient (in this case, correction coefficient 1/correction coefficient 2=353/1474) of the Hall stage 1 by dividing the detection error 353 that is calculated by the detection error calculation unit 23 by the average value 1474 that is calculated by the average value calculation unit 22.

The correction coefficient calculation unit 24 calculates the correction coefficient (in this case, correction coefficient 1/correction coefficient 2=0/1391) of the Hall stage 2 by dividing the detection error 0 that is calculated by the detection error calculation unit 23 by the average value 1391 that is calculated by the average value calculation unit 22.

The correction coefficient calculation unit 24 calculates the correction coefficient (in this case, correction coefficient 1/correction coefficient 2=106/1391) of the Hall stage 3 by dividing the detection error 106 that is calculated by the detection error calculation unit 23 by the average value 1391 that is calculated by the average value calculation unit 22.

The correction coefficient calculation unit 24 calculates the correction coefficient (in this case, correction coefficient 1/correction coefficient 2=426/1391) of the Hall stage 4 by dividing the detection error 426 that is calculated by the detection error calculation unit 23 by the average value 1391 that is calculated by the average value calculation unit 22.

The correction coefficient calculation unit 24 calculates the correction coefficient (in this case, correction coefficient 1/correction coefficient 2=0/1474) of the Hall stage 5 by dividing the detection error 0 that is calculated by the detection error calculation unit 23 by the average value 1474 that is calculated by the average value calculation unit 22.

The correction coefficient calculation unit 24 calculates the correction coefficient (in this case, correction coefficient 1/correction coefficient 2=138/1474) of the Hall stage 6 by dividing the detection error 138 that is calculated by the detection error calculation unit 23 by the average value 1474 that is calculated by the average value calculation unit 22.

In this way, the correction coefficient calculation unit 24 calculates the correction coefficient (correction coefficient 1, correction coefficient 2) by which the counter values of the Hall stages 1 to 6 become the same value and allows the ROM included in the control part 7 to store the correction coefficient when performing a reverse rotation drive control of the brushless motor 1.

Thereby, the switching control unit 9 allows a value obtained by multiplying a previous counter value of each of the Hall stages by a preset correction coefficient (correction coefficient 1/correction coefficient 2) to be a first delay time of each of current Hall edges, generates a PWM command signal having a time period of an electric angle 60° from the power distribution pattern on the basis of each of the Hall edges obtained by correcting each of the Hall edges corrected by the first delay time by a second delay time that advances a Hall edge corresponding to the Hall sensor 3V among the Hall sensors 3U, 3V, 3W, and allows the gate control voltage output unit 8 to output the PWM signal having a time period of an electric angle 60°, and it is possible to perform a reverse rotation drive control of the brushless motor 1.

For example, in the case of the example shown in FIG. 3, the switching control unit 9 allows a counter value obtained by multiplying a previous counter value of the Hall stage 1 by the preset correction coefficient (correction coefficient 1/correction coefficient 2=353/1474 described above) to be a first delay time of a rising time point (current Hall edge) of the position detection signal Hu that constitutes the Hall stage 1 and corrects the Hall edge corrected by the first delay time by advancing an angle of the Hall edge by a time corresponding to the second delay time. Here, the second delay time is a calculation result (shown by 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. Here, the switching control unit 9 calculates that 138/1474×60°≈5° (rounding down the decimal part), calculates that 106/1391×60°≈4° (rounding down the decimal part), performs a calculation of (5°+4°)/2=4° (rounding down the decimal part) from these calculation results, and calculates an average value. The switching control unit 9 generates a PWM command signal on the basis of the Hall edge corrected by the second delay time that advances the Hall edge corresponding to the Hall sensor 3V.

Further, in the case of the example shown in FIG. 3, the switching control unit 9 allows a counter value obtained by multiplying the previous counter value of the Hall stage 2 by the correction coefficient 1/correction coefficient 2=0/1391 described above to be a first delay time of 0 of a falling time point of the position detection signal Hw that constitutes the Hall stage 2 and corrects the Hall edge corrected by the first delay time of 0, that is, the Hall edge which is not corrected, by advancing an angle of the Hall edge by a time corresponding to the second delay time. Here, the second delay time is a calculation result (shown by an advanced angle of 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. The switching control unit 9 generates a PWM command signal on the basis of the Hall edge corrected by the second delay time that advances the Hall edge corresponding to the Hall sensor 3V.

Further, in the case of the example shown in FIG. 3, the switching control unit 9 allows a counter value obtained by multiplying the previous counter value of the Hall stage 3 by the correction coefficient 1/correction coefficient 2=106/1391 described above to be a first delay time of a rising time point of the position detection signal Hv that constitutes the Hall stage 3 and corrects the Hall edge corrected by the first delay time by advancing an angle of the Hall edge by a time corresponding to the second delay time. Here, the second delay time is a calculation result (shown by an advanced angle of 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. The switching control unit 9 generates a PWM command signal on the basis of the Hall edge corrected by the second delay time that advances the Hall edge corresponding to the Hall sensor 3V.

Further, in the case of the example shown in FIG. 3, the switching control unit 9 allows a counter value obtained by multiplying the previous counter value of the Hall stage 4 by the correction coefficient 1/correction coefficient 2=426/1391 described above to be a first delay time of a falling time point of the position detection signal Hu that constitutes the Hall stage 4 and corrects the Hall edge corrected by the first delay time by advancing an angle of the Hall edge by a time corresponding to the second delay time. Here, the second delay time is a calculation result (shown by an advanced angle of 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. The switching control unit 9 generates a PWM command signal on the basis of the Hall edge corrected by the second delay time that advances the Hall edge corresponding to the Hall sensor 3V.

Further, in the case of the example shown in FIG. 3, the switching control unit 9 allows a counter value obtained by multiplying the previous counter value of the Hall stage 5 by the correction coefficient 1/correction coefficient 2=0/1474 described above to be a first delay time of 0 of a rising time point of the position detection signal Hw that constitutes the Hall stage 5 and corrects the Hall edge corrected by the first delay time of 0, that is, the Hall edge which is not corrected, by advancing an angle of the Hall edge by a time corresponding to the second delay time. Here, the second delay time is a calculation result (shown by an advanced angle of 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. The switching control unit 9 generates a PWM command signal on the basis of the Hall edge corrected by the second delay time that advances the Hall edge corresponding to the Hall sensor 3V.

Further, in the case of the example shown in FIG. 3, the switching control unit 9 allows a counter value obtained by multiplying the previous counter value of the Hall stage 6 by the correction coefficient 1/correction coefficient 2=138/1474 described above to be a first delay time of a falling time point of the position detection signal Hu that constitutes the Hall stage 6 and corrects the Hall edge corrected by the first delay time by advancing an angle of the Hall edge by a time corresponding to the second delay time. Here, the second delay time is a calculation result (shown by an advanced angle of 4° in FIG. 3) calculated by the switching control unit 9 based on an average value between an angle obtained by multiplying a division result by 60°, the division result being obtained by dividing a difference of 138 (first correction coefficient) between an average value of 1474 of the Hall stages 1, 5, 6 corresponding to the Hall sensor 3V and a counter value of 1612 of the Hall stage 5 by the average value of 1474 (second correction coefficient) of the Hall stages 1, 5, 6, and an angle obtained by multiplying a division result by 60°, the division result being obtained by dividing a difference of 106 (first correction coefficient) between an average value of 1391 of the Hall stages 2 to 4 corresponding to the Hall sensor 3V and a counter value of 1497 of the Hall stage 2 by the average value of 1391 (second correction coefficient) of the Hall stages 2 to 4. The switching control unit 9 generates a PWM command signal on the basis of the Hall edge corrected by the second delay time that advances the Hall edge corresponding to the Hall sensor 3V.

In this way, on the basis of the V-phase that is structurally designed, the output timing of the position detection signal is corrected by advancing an angle of the Hall edge corrected by the first delay time by a time corresponding to the second delay time, and thereby, it is possible to correct the position detection signal to an originally designed output timing. Thereby, it is possible to generate a PWM command signal having a time period of an electric angle 60° from the power distribution pattern, allow the gate control voltage output unit 8 to output the PWM signal having a time period of an electric angle 60°, and perform a reverse rotation drive control of the brushless motor 1. The advanced angle that becomes the V-phase basis is calculated from the correction coefficient that has been already set, and therefore, a new parameter is not required.

In this way, the embodiment of the present invention is the motor control apparatus 4 that performs a power distribution control on three-phase coils (coils U, V, W) of a brushless motor and that performs a rotation control of a rotor. The motor control apparatus 4 includes the plurality of switching elements UH, UL, VH, VL, WH, WL, the plurality of sensors (Hall sensors 3U, 3V, 3W), and the control part 7.

The plurality of switching elements UH, UL, VH, VL, WH, WL are arranged to be capable of switching a current which is allowed to flow through the coils.

The Hall sensors 3U, 3V, 3W are provided so as to correspond to each of the coils U, V, W and detect a rotation position of the rotor.

The control part 7 outputs a drive signal (PWM signals GWH, GWL, GVH, GVL, GUH, GUL) which switches the switching elements UH, UL, VH, VL, WH, WL on the basis of the position detection signals Hu, Hv, Hw that are outputs of the Hall sensors 3U, 3V, 3W.

The control part 7 includes the gate control voltage output unit 8, the counter value acquisition unit 20, and the switching control unit 9.

The gate control voltage output unit 8 outputs the drive signal which switches the switching elements UH, UL, VH, VL, WH, WL based on a corrected Hall edge that constitutes each of the six Hall stages which are represented by a combination of electric potentials of the position detection signals Hu, Hv, Hw that are outputs of the Hall sensors 3U, 3V, 3W.

The counter value acquisition unit 20 acquires a counter value which is a time period of the Hall stage and which is represented by a time period between two Hall edges that constitute each of the Hall stages from the position detection signal.

The switching control unit 9 allows a value obtained by multiplying a previous counter value of each of the Hall stages by a preset correction coefficient (correction coefficient 1/correction coefficient 2) to be a first delay time of each of current Hall edges and allows the gate control voltage output unit 8 to output the drive signal based on each of the Hall edges obtained by correcting each of the Hall edges corrected by the first delay time by a second delay time that advances a Hall edge corresponding to the Hall sensor 3V among the Hall sensors 3U, 3V, 3W.

Further, the control part 7 includes the reference position detection signal determination unit 21, the average value calculation unit 22, the detection error calculation unit 23, and the correction coefficient calculation unit 24.

The reference position detection signal determination unit 21 allows, among two Hall edges that constitute a Hall stage of which a counter value acquired by the counter value acquisition unit 20 is minimum, a Hall edge of which the counter value is decreased by enlarging the Hall edge in a rotation direction of the brushless motor 1 to be a reference Hall edge and determines the position detection signal which corresponds to a phase at which the reference Hall edge is present as a reference position detection signal. The average value calculation unit 22 calculates an average value (correction coefficient 2) of counter values of three phases in the rotation direction of the brushless motor of the reference position detection signal.

The detection error calculation unit 23 calculates a detection error (correction coefficient 1) which is a difference between the average value and the counter value of each of the Hall stages.

The correction coefficient calculation unit 24 calculates the correction coefficient (correction coefficient 1/correction coefficient 2) of each of the Hall stages by dividing the detection error by the average value.

The switching control unit 9 divides a first correction coefficient that is included in the correction coefficient and that is a detection error which is a difference between the average value and a counter value of a Hall stage corresponding to the Hall sensor 3V by a second correction coefficient that is included in the correction coefficient and that is the average value, calculates the second delay time based on an angle obtained by multiplying a division result by 60°, and corrects each of the Hall edges corrected by the first delay time by advancing an angle of each of the Hall edges by a time corresponding to the second delay time.

Further, the control part 7 has a storage unit that stores the correction coefficient (correction coefficient 1/correction coefficient 2) by a correction coefficient calculation performed before shipping of the motor control apparatus 4.

Further, the three Hall sensors 3U, 3V, 3W (the plurality of sensors) are attached to the planar substrate 3B that is separated from the sensor magnet 2, and a distance from the Hall sensor 3V (predetermined sensor) to the sensor magnet 2 is the shortest distance among distances of the three Hall sensors 3U, 3V, 3W to the sensor magnet 2.

Thereby, according to the embodiment of the present invention, it is possible to provide a low-cost motor control apparatus that has the switching control unit 9 in which the position detection signal is corrected for each Hall edge that represents switching of the Hall stage and which switches the power distribution pattern at an electric angle 60° on the basis of the corrected position detection signal and that is capable of preventing oscillation and an abnormal sound from occurring with good accuracy by correcting the position detection signal to the originally designed output timing; and a control method of the motor control apparatus.

The motor control apparatus 4 in the embodiment described above may be realized by a computer. In that case, a program for realizing this function may be recorded in a computer-readable recording medium, and the program recorded in the recording medium may be read into and executed on a computer system to thereby realize the function. The "computer system" used herein includes an OS or hardware such as peripherals. The "computer-readable recording medium" refers to portable media such as a flexible disk, a magneto-optical disc, a ROM, and a CD-ROM and a storage device such as a hard disk embedded in the computer system. Further, the "computer-readable recording medium" may include a recording medium that holds a program dynamically for a short period of time like a network such as the Internet or a communication line when a program is transmitted through a communication line such as a telephone line and may include a recording medium that stores a program for a predetermined period of time like a volatile memory in a computer system which serves as a server or a client in that case. Further, the above program may be a program for realizing some of the functions described above, may be a program capable of realizing the above functions by combination with a program already recorded in the computer system, or may be a program that is realized by using a programmable logic device such as the FPGA (Field-Programmable Gate Array).

In the control part 4 in the embodiment described above, the calculation expression for acquiring the values, the coefficients, and the like, and handling of values in the decimal part of the calculation method and the like are not particularly limited.

Although the embodiment of the aspect of the invention has been described in detail with reference to the drawings, a specific configuration is not limited to the embodiment, and designs and the like without departing from the scope of the invention are also included.

DESCRIPTION OF THE REFERENCE SYMBOLS

1 brushless motor
3U, 3V, 3W Hall sensor
4 motor control apparatus
6 inverter circuit
7 control part
8 gate control voltage output unit
9 switch control unit
20 counter value acquisition unit
21 reference position detection signal determination unit
22 average value calculation unit
23 detection error calculation unit
24 correction coefficient calculation unit
U, V, W coil
UH, UL, VH, VL, WH, WL switching element

The invention claimed is:

1. A motor control apparatus that is configured to perform a power distribution control on three-phase coils of a brushless motor and that is configured to perform a rotation control of a rotor, the motor control apparatus comprising:
a plurality of switching elements that are arranged to be capable of switching a current which is allowed to flow through the coils;
a plurality of sensors each of which is provided so as to correspond to each of the coils and which are configured to detect a rotation position of the rotor; and
a control part that is configured to output a drive signal which switches the switching element based on a position detection signal that is an output of the plurality of sensors, wherein the control part comprises:
a gate control voltage output unit that is configured to output a drive signal which switches the switching element based on a corrected Hall edge that constitutes each of six Hall stages which are represented by a combination of electric potentials of position detection signals that are outputs of the plurality of sensors;
a counter value acquisition unit that is configured to acquire a counter value which is a time period of the Hall stage and which is represented by a time period between two Hall edges that constitute each of the Hall stages from the position detection signal; and
a switching control unit that is configured to allow a value obtained by multiplying a previous counter value of each of the Hall stages by a preset correction coefficient to be a first delay time of each of current Hall edges and allow the gate control voltage output unit to output the drive signal based on each of the Hall edges obtained by correcting each of the Hall edges corrected by the first delay time by a second delay time that advances a Hall edge corresponding to a predetermined sensor among the plurality of sensors.

2. The motor control apparatus according to claim 1, wherein the control part comprises:
a reference position detection signal determination unit that is configured to allow, among two Hall edges that constitute a Hall stage of which a counter value acquired by the counter value acquisition unit is minimum, a Hall edge of which the counter value is decreased by enlarging the Hall edge in a rotation direction of the brushless motor to be a reference Hall edge and determine the position detection signal which corresponds to a phase at which the reference Hall edge is present as a reference position detection signal;
an average value calculation unit that is configured to calculate an average value of counter values of three phases in the rotation direction of the brushless motor of the reference position detection signal;
a detection error calculation unit that is configured to calculate a detection error which is a difference between the average value and the counter value of each of the Hall stages; and
a correction coefficient calculation unit that is configured to calculate the correction coefficient of each of the Hall stages by dividing the detection error by the average value,
wherein the switching control unit: divides a first correction coefficient that is included in the correction coefficient and that is a detection error which is a difference between the average value and a counter value of a Hall stage corresponding to a predetermined sensor among the plurality of sensors by a second correction coefficient that is included in the correction coefficient and that is the average value; calculates the second delay time based on an angle obtained by multiplying a division result by 60'; and corrects each of the Hall edges corrected by the first delay time by advancing an angle of each of the Hall edges by a time corresponding to the second delay time.

3. The motor control apparatus according to claim 2, wherein the control part has a storage unit that is configured to store the correction coefficient by a calculation of the correction coefficient performed before shipping of the motor control apparatus.

4. The motor control apparatus according to claim 3, wherein the plurality of sensors are attached to a planar substrate that is separated from a sensor magnet, and a distance from the predetermined sensor to the sensor magnet is the shortest distance among distances of the plurality of sensors to the sensor magnet.

5. The motor control apparatus according to claim 2, wherein the plurality of sensors are attached to a planar substrate that is separated from a sensor magnet, and a distance from the predetermined sensor to the sensor magnet is the shortest distance among distances of the plurality of sensors to the sensor magnet.

6. The motor control apparatus according to claim 1, wherein the control part has a storage unit that is configured to store the correction coefficient by a calculation of the correction coefficient performed before shipping of the motor control apparatus.

7. The motor control apparatus according to claim 6, wherein the plurality of sensors are attached to a planar substrate that is separated from a sensor magnet, and a distance from the predetermined sensor to the sensor magnet is the shortest distance among distances of the plurality of sensors to the sensor magnet.

8. The motor control apparatus according to claim 1, wherein the plurality of sensors are attached to a planar substrate that is separated from a sensor magnet, and a distance from the predetermined sensor to the sensor magnet is the shortest distance among distances of the plurality of sensors to the sensor magnet.

9. A motor control apparatus control method which is a control method of a motor control apparatus that is configured to perform a power distribution control on three-phase coils of a brushless motor and that is configured to perform a rotation control of a rotor,
wherein the motor control apparatus comprises:
a plurality of switching elements that are arranged to be capable of switching a current which is allowed to flow through the coils;
a plurality of sensors each of which is provided so as to correspond to each of the coils and which are configured to detect a rotation position of the rotor; and
a control part that is configured to output a drive signal which switches the switching element based on a position detection signal that is an output of the plurality of sensors,
wherein the control part comprises a gate control voltage output unit, a counter value acquisition unit, and a switching control unit, and
wherein the control method comprises:
by way of the gate control voltage output unit, outputting a drive signal that switches the switching element based on a corrected Hall edge that constitutes each of six Hall stages which are represented by a combination of electric potentials of position detection signals that are outputs of the plurality of sensors;
by way of the counter value acquisition unit, acquiring a counter value which is a time period of the Hall stage and which is represented by a time period between two Hall edges that constitute each of the Hall stages from the position detection signal; and
by way of the switching control unit, allowing a value obtained by multiplying a previous counter value of each of the Hall stages by a preset correction coefficient to be a first delay time of each of current Hall edges and allowing the gate control voltage output unit to output the drive signal based on each of the Hall edges obtained by correcting each of the Hall edges corrected by the first delay time by a second delay time that advances a Hall edge corresponding to a predetermined sensor among the plurality of sensors.

\* \* \* \* \*